US008321178B2

(12) United States Patent
Hirooka

(10) Patent No.: US 8,321,178 B2
(45) Date of Patent: Nov. 27, 2012

(54) PLANT FACILITY MANAGING SYSTEM

(75) Inventor: Isao Hirooka, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 11/730,620

(22) Filed: Apr. 3, 2007

(65) Prior Publication Data
US 2007/0239396 A1 Oct. 11, 2007

(30) Foreign Application Priority Data
Apr. 5, 2006 (JP) ................. 2006-104175

(51) Int. Cl.
G06F 11/00 (2006.01)
(52) U.S. Cl. ..................................... 702/183
(58) Field of Classification Search .............. 702/81–84, 702/113–115, 182–185, 57–59, 64, 65, 90, 702/91, 188, 189; 700/9, 17–18, 28–32, 700/108–110, 95, 97; 703/1–2, 6–7
See application file for complete search history.

(56) References Cited

U.S. PATENT DOCUMENTS

| 5,625,574 | A | * | 4/1997 | Griffiths et al. | 702/183 |
| 5,838,563 | A | * | 11/1998 | Dove et al. | 700/83 |
| 5,914,875 | A | * | 6/1999 | Monta et al. | 700/79 |
| 6,421,571 | B1 | * | 7/2002 | Spriggs et al. | 700/17 |
| 6,795,798 | B2 | * | 9/2004 | Eryurek et al. | 702/188 |
| 7,020,595 | B1 | * | 3/2006 | Adibhatla et al. | 703/7 |
| 2002/0052712 | A1 | * | 5/2002 | Voser et al. | 702/182 |
| 2005/0240382 | A1 | * | 10/2005 | Nakaya et al. | 703/6 |

FOREIGN PATENT DOCUMENTS

| JP | 6-229791 A | 8/1994 |
| JP | 2003-316424 A | 11/2003 |
| JP | 2003-316430 A | 11/2003 |

* cited by examiner

Primary Examiner — Mohamed Charioui
(74) Attorney, Agent, or Firm — Westerman, Hattori, Daniels & Adrian, LLP

(57) ABSTRACT

A plant facility managing system capable of executing diagnoses by utilizing respective facility parameters against a plurality of facilities, and capable of using the result of a diagnosis as an input for another diagnosis. The plant facility managing system comprising a diagnosis processing unit for acquiring respective facility parameters held by a plurality of facilities operating inside a plant to thereby execute predetermined computations. The plant facility managing system further comprising a virtual facility defined-unit for generating a virtual facility where a plurality of facility parameters are gathered, the diagnosis processing unit receiving the facility parameters of the virtual facility as targets for diagnosis to thereby execute the predetermined computations.

5 Claims, 5 Drawing Sheets

PLANT FACILITY MANAGING SYSTEM

FIELD OF THE INVENTION

The invention relates to a plant facility managing system comprising a diagnosis processing unit for acquiring respective facility parameters held by a plurality of facilities operating inside a plant to thereby execute predetermined computations.

BACKGROUND OF THE INVENTION

A plant facility managing system is capable of acquiring respective facility parameters held by a plurality of facilities operating inside a plant to make a diagnosis for trouble prediction.

FIG. 4 is a functional block diagram showing an example of a configuration of a conventional plant facility managing system connected to a decentralized managing system. Block 1 is a plant. A plurality of facilities, shown by 11, 12, . . . 1n are operating inside a plant 1, Each facility is referred to as E1, E2, . . . En, respectively. Each facility is a single unit comprising any of a measuring instrument, rotary equipment, still equipment, or combination thereof.

Facilities E1, E2, . . . En are connected to a field bus 2, and communicate with a controller 3 similarly connected to the field bus 2 to be thereby controlled. A control bus 4 is connected to the controller 3 and an operation monitoring unit 5 for communicating therewith.

Block 6 is a plant facility managing system. Block 61 is a field communication server which acquires respective facility parameters held by the facilities operating inside the plant 1 during a given cycle. The facility parameters are sent via the controller 3 for storage in a plant facility managing database 62 for a predetermined period of time.

Block 63 is a facility input unit for reading the respective facility parameters of the facilities E1, E2, . . . En, as targets for diagnosis, from the plant facility managing database 62, thereby setting the respective facility parameters therein. Block 64 is a diagnosis processing unit provided with diagnostic programs D1, D2, . . . , Dn, corresponding to the facilities E1, E2, . . . En, as the targets for diagnosis Block 65 is a diagnosis output unit for holding results R1, R2, . . . , Rn of diagnoses executed according to the diagnostic programs D1, D2, . . . , Dn, respectively.

Block 66 is a diagnosis control means for communicating with the plant facility managing database 62, facility input unit 63, diagnosis processing unit 64, and diagnosis output unit 65, to thereby execute sequence control of diagnostic steps. Block 67 is a man-machine means for communicating with the diagnosis control means 66, and Block 67a is a management screen as displayed on a monitor.

FIG. 5 shows a display example of the management screen 67a. In the figure, there is shown a hierarchical structure where the facilities E1, E2, . . . En are managed in respective folders in an upper hierarchy while the facility parameters, and information on the results of the diagnoses against the respective facilities are managed in a lower hierarchy for the respective folders. In this case, designations of the facility parameters are each referred to simply as "facility parameter name", and designations of the results of the diagnoses are each referred to as "diagnosis name-facility parameter name".

In JP 2003-316424 A, there is described an equipment diagnosis system for integrally managing, and executing diagnoses against field apparatuses, disposed at respective spots within a plant.

A conventional plant facility managing system has had the following problems:

(1) A diagnostic process is independent by the facility, so that it is not possible to easily carry out a diagnosis against a plurality of facilities as targets for the diagnosis (a comprehensive diagnosis against, for example, facilities E1, and E2 by making use of respective facility parameters for the facilities E1, and E2).

(2) It will be possible to attain a more reliable diagnosis by making use of the result of a diagnosis (diagnosis output) as an input for another diagnosis, however, correlating of the former with the latter cannot be easily implemented.

SUMMARY OF THE INVENTION

The invention has been developed in order to resolve problems described as above, and it is an object of the invention to realize a plant facility managing system capable of executing diagnoses by utilizing respective facility parameters against a plurality of facilities, or capable of making use of the result of a diagnosis as an input for another diagnosis.

To that end, the invention provides a plant facility managing system of the following configuration:

(1) A plant facility managing system characterized in comprising a diagnosis processing unit for acquiring respective facility parameters held by a plurality of facilities operating inside a plant to thereby execute predetermined computations, said plant facility managing system further comprising a virtual facility defined-unit for generating a virtual facility where a plurality of facility parameters are gathered, wherein the diagnosis processing unit receives the facility parameters of the virtual facility as targets for diagnosis to thereby execute the predetermined computations.

(2) The plant facility managing system as set forth under item (1) as above is characterized in that the virtual facility defined-unit acquires results of diagnosis by the diagnosis processing unit, managing the results of the diagnosis as the facility parameters of the virtual facility.

(3) The plant facility managing system as set forth under items (1) or (2) as above is characterized in that the virtual facility defined-unit generates a virtual facility where the facility parameters and the facility parameters of the virtual facility are gathered.

(4) The plant facility managing system as set forth under items (1) or (2) as above is characterized in that the virtual facility defined-unit generates a plurality of virtual facilities each with the facility parameters thereof being gathered.

(5) The plant facility managing system as set forth under any of items (1) to (4) as above is characterized in that the diagnosis processing unit is provided with at least either the diagnostic programs corresponding to the respective facility parameters of the facilities, or the diagnostic programs corresponding to the respective facility parameters of the virtual facility.

(6) The plant facility managing system as set forth under any of items (1) to (5) as above is characterized in that the facilities are managed in an upper hierarchy while the facility parameters managed in a lower hierarchy, and results of the diagnoses against the respective facilities are managed in the same hierarchy as that for the facility parameters.

(7) The plant facility managing system as set forth under any of items (1) to (6) as above is characterized in that the virtual facility is managed in the upper hierarchy that is the same hierarchy as that for the facilities, and the facility parameters of the virtual facility, and the results of diagnoses thereof are managed in the same hierarchy that is the lower hierarchy.

(8) The plant facility managing system as set forth under any of items (1) to (7) as above is characterized in that at least either the facility parameter displayed on the management screen, or the result of diagnosis, displayed on the management screen, is selected to be then dragged, and dropped into an icon for displaying the diagnostic programs, thereby executing a process for correlating the facility, as the target for the diagnosis, with the diagnostic program.

As is evident from the forgoing description, the invention has the following advantageous effects:

(1) By defining the virtual facility where the plurality of the facility parameters are gathered, and by making a diagnosis on the same by use of the diagnostic program similar to that for a common facility, it has become possible to make a comprehensive diagnosis against, for example, facilities E1, and E2 by making use of respective facility parameters for the facilities E1, and E2.

(2) By managing the result of a diagnosis of a facility (including the virtual facility) and the facility parameters thereof in the same hierarchy, it has become possible to easily execute setting so as to correlate the result of the diagnosis with any other diagnostic program by a drag and drop operation on the management screen.

PREFERRED EMBODIMENTS OF THE INVENTION

Figure 1:
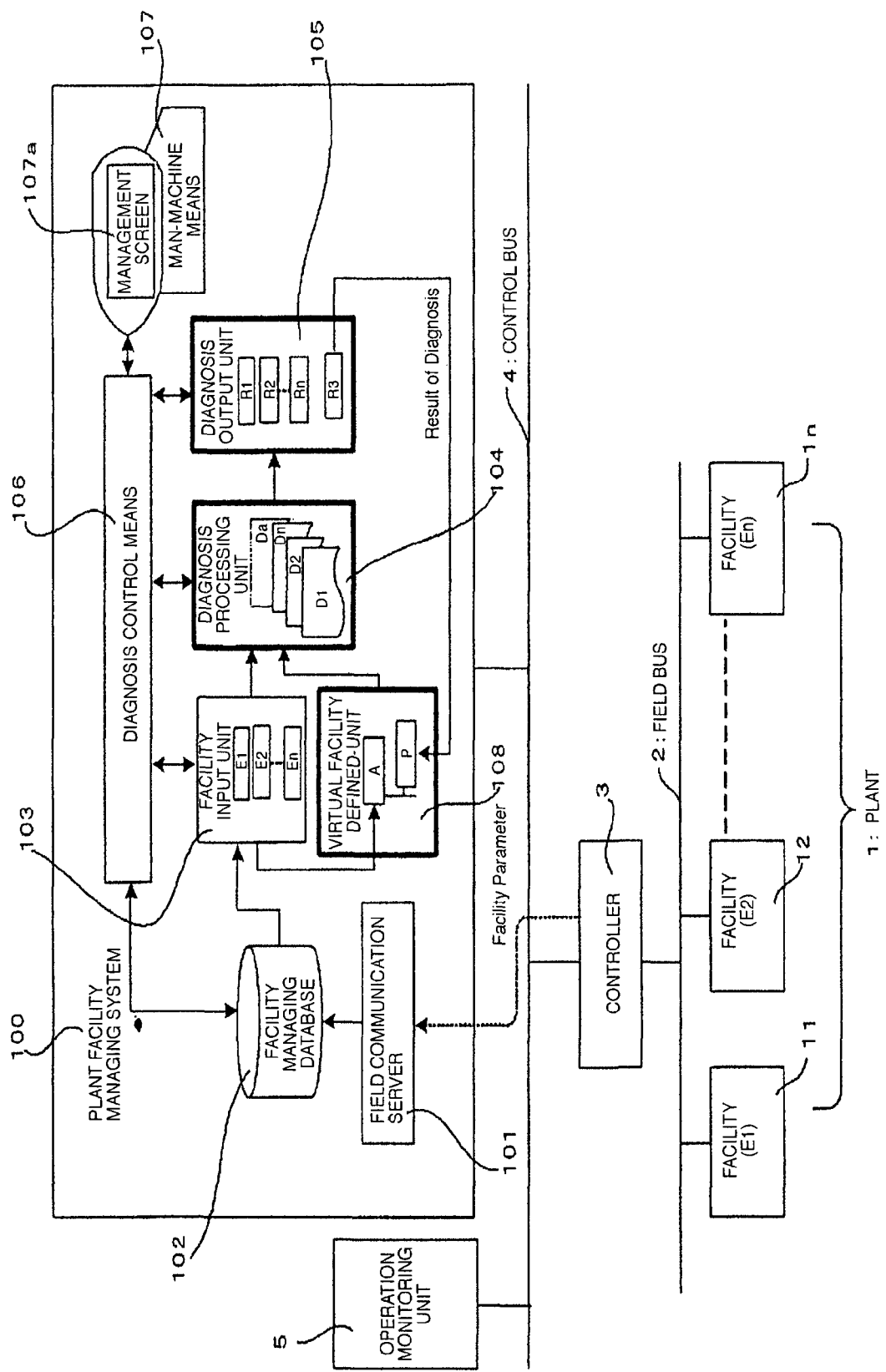
FIG. 1 is a functional block diagram showing an embodiment of a plant facility managing system connected to a decentralized managing system, according to the invention.
Figure 4:
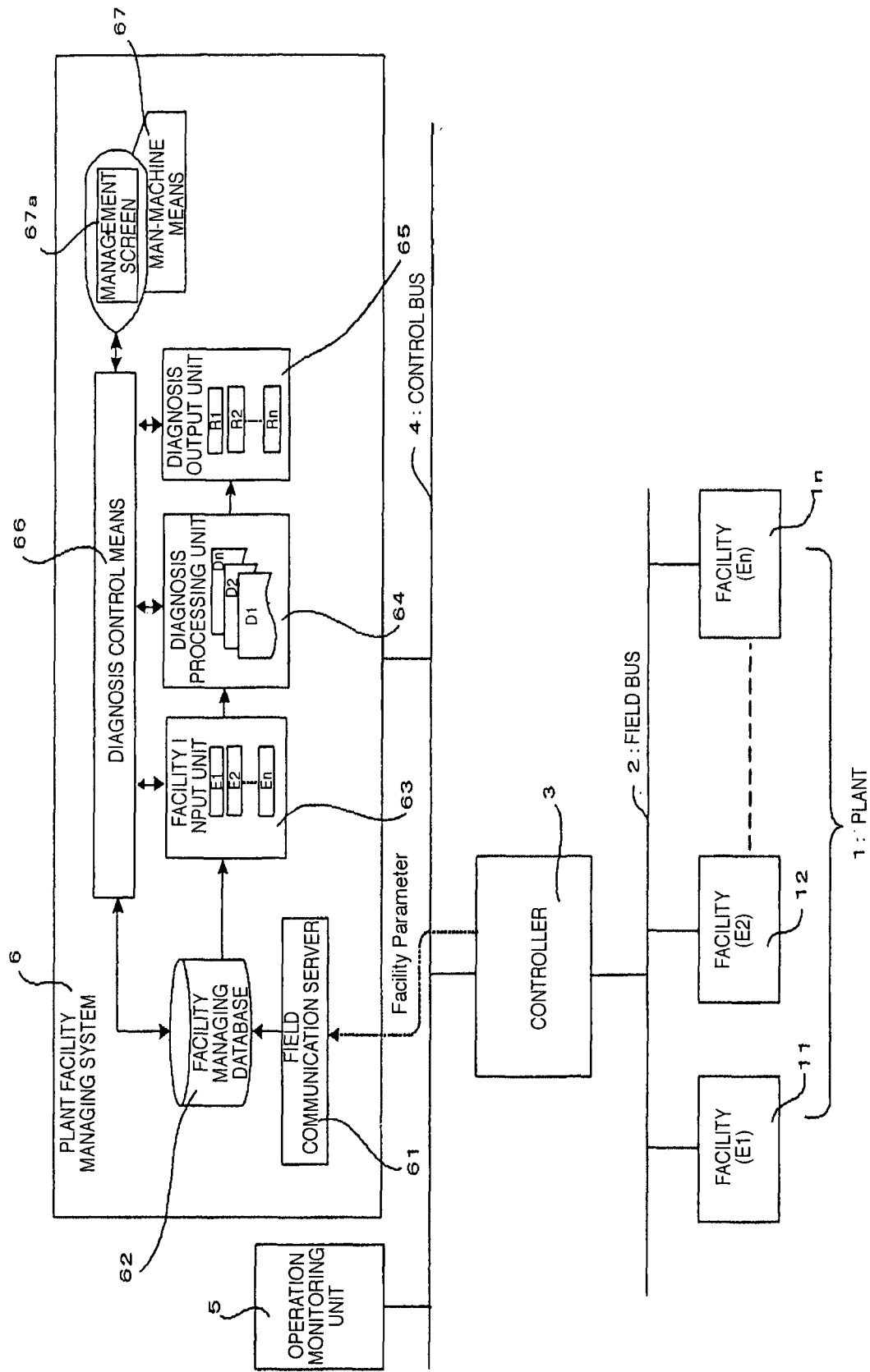
FIG. 4 is a functional block diagram showing an example of a configuration of a conventional plant facility managing system connected to a decentralized managing system.

The invention is described in detail hereinafter with reference to the accompanying drawings. FIG. 1 is a functional block diagram showing an embodiment of a plant facility managing system connected to a decentralized managing system, according to the invention. In the figure, constituent elements identical to those in the conventional plant facility managing system as described with reference to FIG. 4 are depicted by the same reference numerals, thereby omitting description thereof. Features of the invention are described hereinafter.

100 is a plant facility managing system to which the invention is applied. A field communication server 101, a facility managing database 102, a facility input unit 103, diagnosis processing unit 104, a diagnosis output unit 105, a diagnosis control means 106, and a man-machine means 107 are basically identical in function to the respective constituent elements 61 to 67 of the conventional plant facility managing system as described with reference to FIG. 4. 108 is a virtual facility defined-unit, representing a feature of the invention. The virtual facility defined-unit 108 generates a virtual facility A where a plurality of facility parameters are gathered. The facility parameters of the virtual facility A are treated in the same way as facility parameters of a common facility and are inputted to the diagnosis processing unit 104.

The diagnosis processing unit 104 is provided with a diagnostic program Da for the virtual facility A, and the result of a diagnosis according to the diagnostic program Da is held as Ra by the diagnosis output unit 105. The virtual facility defined-unit 108 acquires the result of the diagnosis Ra from the diagnosis output unit 105, thereby managing the same as the facility parameter of the virtual facility A.

Figure 2:
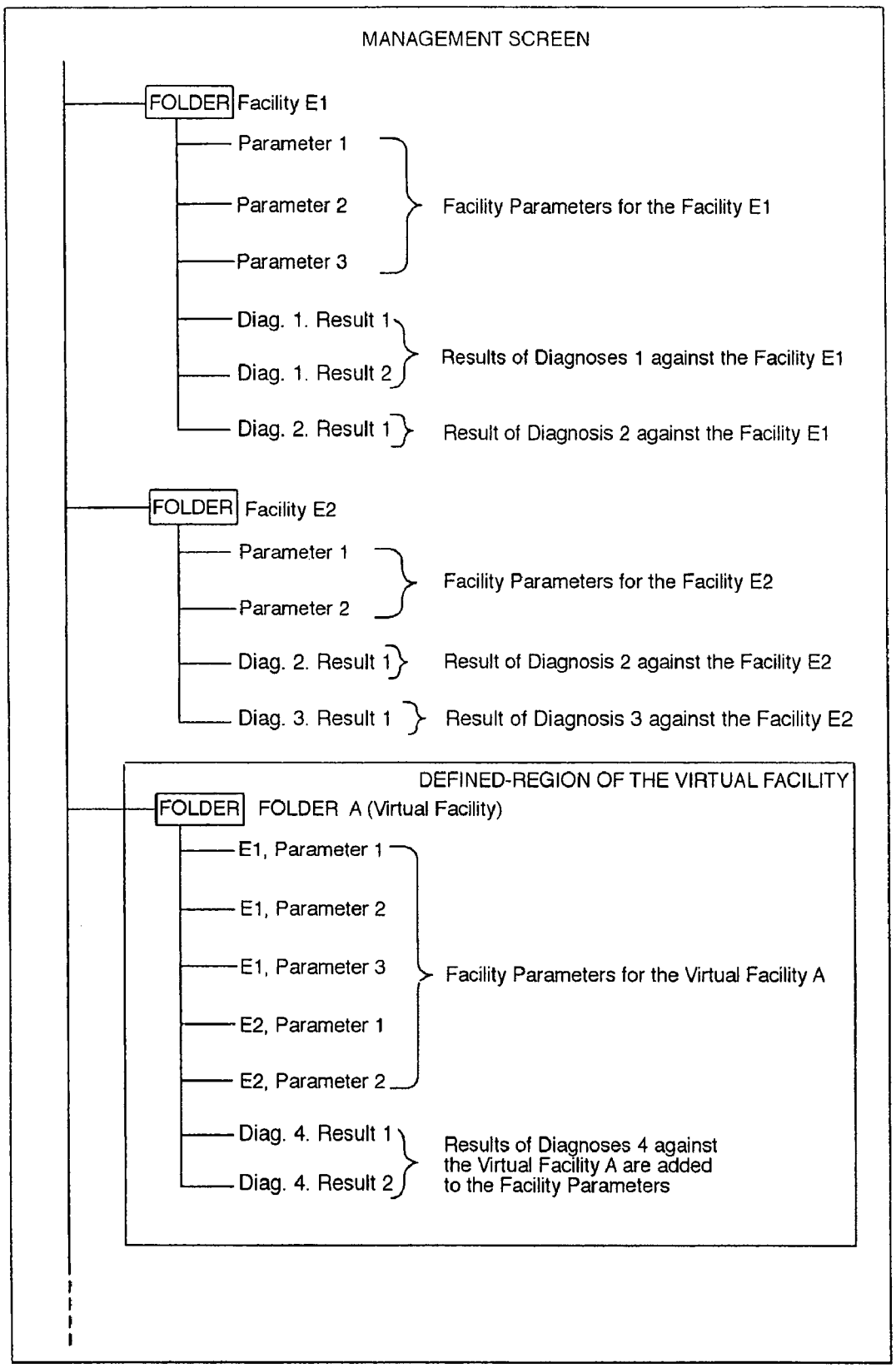
FIG. 2 shows a display example of a management screen, according to the invention.
Figure 5:
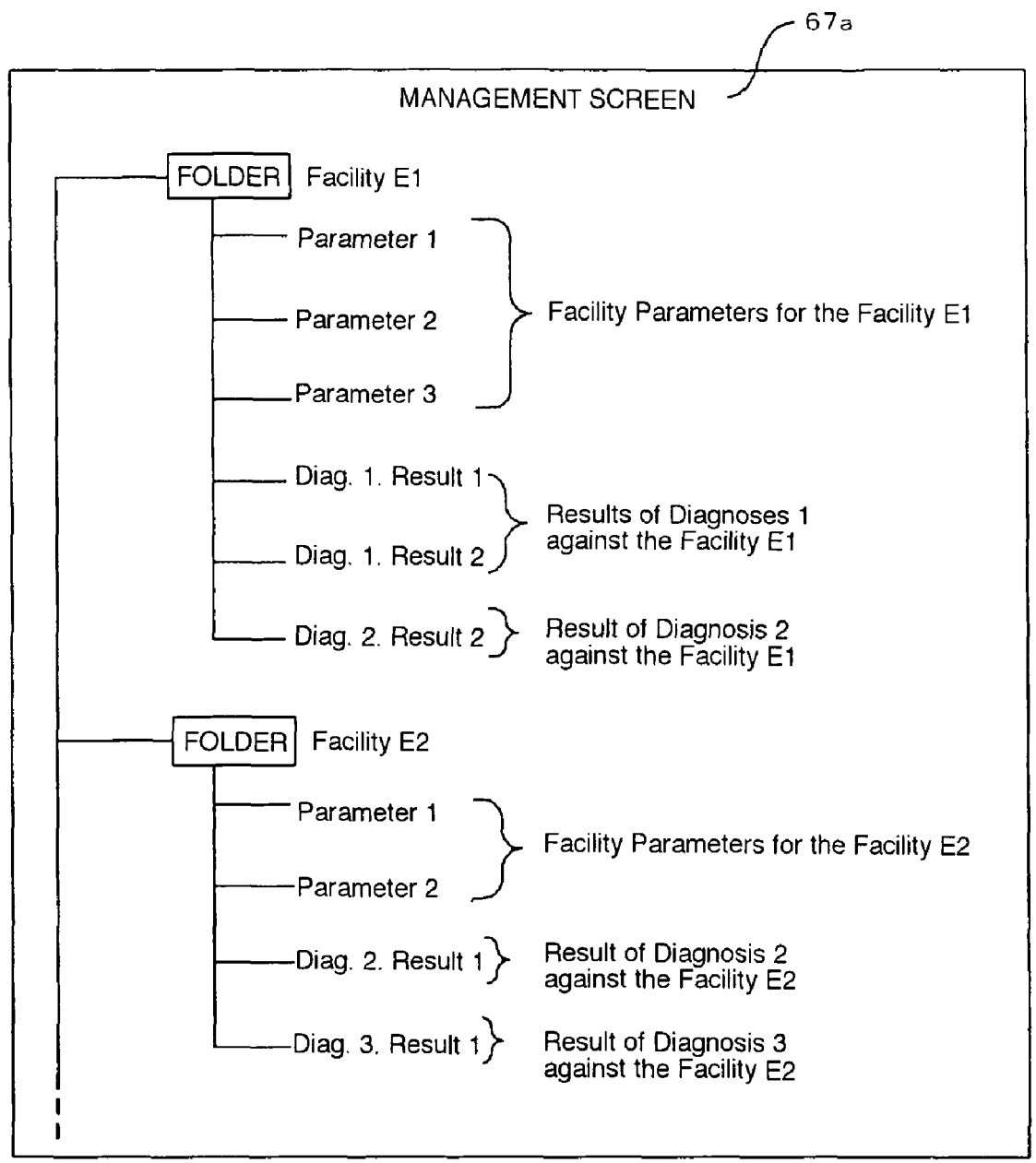
FIG. 5 shows a display example of a management screen of the conventional system.

FIG. 2 shows a display example of a management screen 107a of the man-machine means 107. In addition to the hierarchical structure described with reference to FIG. 5, folders of the virtual facility A are managed in the same hierarchy as that for the facilities E1, E2, ... within a defined-region of the virtual facility A.

The facility parameters as gathered, and the results of the diagnoses, added thereto, are managed in the same hierarchy, which is lower in hierarchy than that for the folders. In this case, designations of the facility parameters are each referred to as "facility name•facility parameter name", and designations of the results of the diagnoses are each referred to as "diagnosis name•result parameter name".

Figure 3:
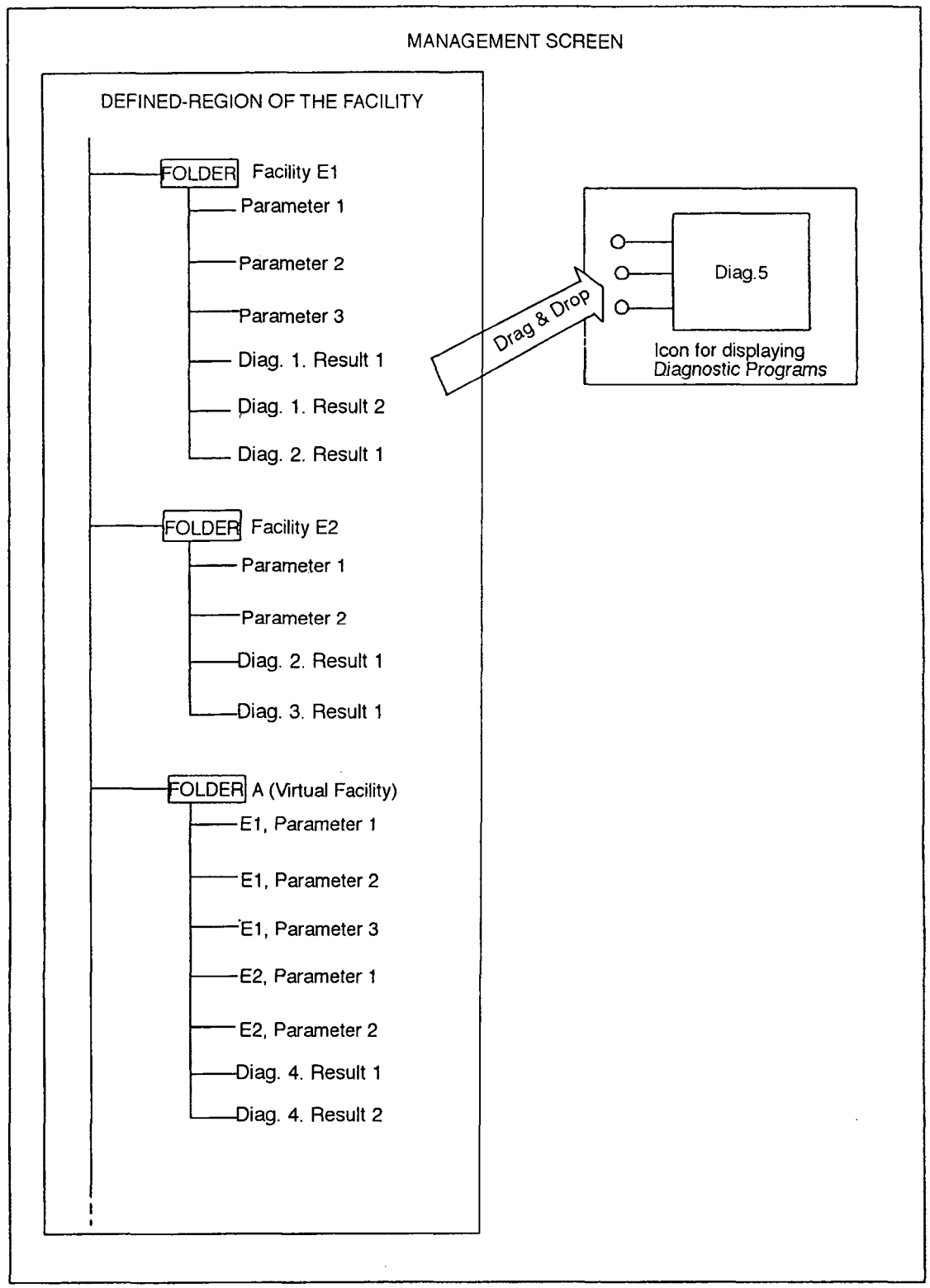
FIG. 3 shows a display example of the management screen where a process for correlating facilities, as targets for diagnosis, with diagnostic programs, respectively, is executed.

With, the present embodiment, there is shown an example where facility parameters of facilities E1, and E2 as the virtual facility A are gathered, for brevity, however, the virtual facility defined-unit 108 is capable of generating a virtual facility where the facility parameters of facilities, and the facility parameters of the virtual facility are gathered, and generating a plurality of virtual facilities where the facility parameters of the respective virtual facilities are gathered. FIG. 3 shows a display example of a management screen where a process for correlating the facilities, as targets for diagnoses, with the diagnostic programs, respectively, is executed. If at least either the facility, and the facility parameter of the virtual facility, displayed on the management screen, or the result of a diagnosis, displayed on the management screen, is selected with a mouse, and so forth, to be then dragged and dropped into an icon for displaying the diagnostic programs, this will enable setting for inputting the facility selected as the target for the diagnosis to the diagnostic programs to be automatically executed.

With the invention, the facility parameters of the facilities, and the virtual facility, respectively, or the results of diagnosis are all managed in the same hierarchy to be displayed on the screen, so that selection thereof and a drag and drop operation are rendered quite simple, thereby eliminating the need for the user to execute an onerous operation for input setting.

What is claimed is:

1. A plant facility managing system comprising:
a facility input unit receives facility parameters held by a plurality of facilities operating inside a plant;
a diagnosis processing unit receives the facility parameters directly from the facility input unit and executes predetermined computations on the received facility parameters;
a diagnosis output unit receives results of the executed predetermined computations directly from the diagnosis processing unit, and holds the results in the diagnosis output unit; and
a virtual facility defined-unit receives the results of the executed predetermined computations directly from the diagnosis output unit and generates a virtual facility where the plurality of facility parameters are gathered,
wherein the diagnosis processing unit is provided with a diagnostic program for the virtual facility and receives the facility parameters of the virtual facility as targets for a first diagnosis to thereby execute the predetermined computations, wherein the virtual facility defined-unit acquires results of the first diagnosis directly from the diagnosis processing unit, managing the results of the first diagnosis as the facility parameters of the virtual facility, and wherein the results of the first diagnosis are directly input into the diagnosis processing unit from the virtual facility defined-unit for a second diagnosis.

2. The plant facility managing system according to claim 1, wherein the facilities are managed in an upper hierarchy while the facility parameters managed in a lower hierarchy, and results of the diagnoses against the respective facilities are managed in the same hierarchy as that for the facility parameters.

3. The plant facility managing system according to claim 1, wherein the virtual facility is managed in the upper hierarchy that is the same hierarchy as that for the facilities, and the facility parameters of the virtual facility, and the results of diagnoses thereof are managed in the same hierarchy that is the lower hierarchy.

4. The plant facility managing system according to claim 1, wherein at least either the facility parameter displayed on the management screen, or the result of diagnosis, displayed on a management screen, is selected to be then dragged, and dropped into an icon for displaying the diagnostic programs, thereby executing a process for correlating the facility, as the target for the diagnosis, with the diagnostic program.

5. The plant facility managing system according to claim 1, wherein each of the facilities is a single unit of a measuring instrument, rotary equipment, still equipment, or combination thereof.

* * * * *